United States Patent
Thompson

[19]

[11] Patent Number: 5,568,858
[45] Date of Patent: Oct. 29, 1996

[54] POWER DRIVE UNIT FOR AIRCRAFT CARGO HANDLING SYSTEMS

[75] Inventor: James R. Thompson, Middleville, Mich.

[73] Assignee: Vickers, Incorporated, Maumee, Ohio

[21] Appl. No.: 326,213

[22] Filed: Oct. 20, 1994

[51] Int. Cl.$^6$ .................................................. B65G 13/06
[52] U.S. Cl. .................. 198/781.06; 198/782; 244/137.1
[58] Field of Search ............................... 198/781.06, 782; 414/532, 533; 244/137.1

[56] References Cited

U.S. PATENT DOCUMENTS

| | | | |
|---|---|---|---|
| 3,698,539 | 10/1972 | Schwarzbeck | 198/782 |
| 4,006,816 | 2/1977 | Werntz . | |
| 4,286,441 | 9/1981 | Scheneman, Jr. et al. . | |
| 4,343,396 | 8/1982 | George | 198/781.06 |
| 4,488,638 | 12/1984 | Morgan et al. . | |
| 4,534,462 | 8/1985 | Hoover et al. . | |
| 5,020,657 | 6/1991 | Huber . | |
| 5,170,966 | 12/1992 | Sheu . | |
| 5,186,417 | 2/1993 | Pritchard . | |
| 5,213,201 | 5/1993 | Huber et al. . | |

*Primary Examiner*—Joseph E. Valenza
*Attorney, Agent, or Firm*—Barnes, Kisselle, Raisch, Choate, Whittemore & Hulbert, P.C.

[57] ABSTRACT

A power drive unit for aircraft cargo handling systems that includes an electric motor and a drive roller mounted on for rotation about an axis parallel to the motor output shaft for engagement with cargo to be driven by the unit. A planetary gear differential and a torque control arrangement couple the motor output shaft to a self-erecting mechanism for lifting the unit into engagement with cargo, and to the drive roller for propelling the cargo. A scrub sensor is coupled to the drive roller for modulating application of electrical power to the motor when the drive roller is scrubbing against cargo engaged by the roller.

21 Claims, 4 Drawing Sheets

1

POWER DRIVE UNIT FOR AIRCRAFT CARGO HANDLING SYSTEMS

The present invention is directed to aircraft cargo handling systems, and more particularly to a power drive unit for engaging and moving cargo in such systems.

BACKGROUND AND SUMMARY OF THE INVENTION

Power drive units for aircraft cargo handling systems conventionally include a drive roller coupled to an electric motor for engaging and propelling cargo on a ball or roller conveyor surface to and from storage positions within an aircraft hull. When cargo becomes stacked or jammed, continued operation of the drive roller scrubs the outer surface of the roller against the cargo engaged by the roller. Such scrubbing wears the friction surface of the drive roller and wastes electrical energy at the motor. It is therefore one object of the present invention to provide a mechanism for sensing and preventing scrubbing between the drive roller and cargo in aircraft handling systems of the subject character.

Self-erecting power drive units are particularly advantageous in many aircraft cargo handling system applications. In these units, application of electrical power to the drive motor initially operates through cams that engage a fixed mechanism to raise the drive unit from a retracted position beneath the conveyor surface to an erected position in which the drive roller is disposed at the cargo conveyor plane for engagement with the cargo units. Another object of the present invention is to provide an improved power splitting planetary gear differential between the motor on the one hand, and the self-erecting mechanism and drive roller on the other, that includes an improved torque control mechanism of reduced weight for splitting power between the self-erecting mechanism and the drive roller, that has no wear surfaces, and that does not employ a fluid that can overheat or leak.

A power drive unit for aircraft cargo handling systems in accordance with the present invention includes an electric motor and a drive roller mounted to rotate about an axis parallel to the motor output shaft and carried for engagement with cargo to be driven by the unit. A gear transmission couples the motor output shaft to the drive roller shaft for rotating the drive roller responsive to application of electrical power to the motor. A scrub sensor modulates application of electrical power to the motor when the drive roller is scrubbing against cargo engaged by the drive roller. The scrub sensor in the preferred embodiments of the invention includes a second roller mounted for free rotation adjacent to the drive roller and having a periphery disposed for engagement with cargo engaged by the drive roller. Application of electrical power to the motor is modulated as a function of rotation of the second roller.

In a self-erecting power drive unit in accordance with the preferred embodiments of the invention, the gear transmission comprises a power-splitting planetary gear differential having an input coupled to the motor output shaft, a first output coupled to a mechanism for erecting the unit from a retracted position to an erected position in which the drive roller is positioned to engage cargo, and a second output coupled to the drive roller. Torque applied by the differential is controlled for first coupling drive torque from the motor to the self-erecting mechanism to raise the unit to the erected position, and then for coupling drive torque from the motor to the drive roller after the unit is erect. Torque control preferably is accomplished by a magnetic clutch that includes a first array of magnets rotatably coupled to the differential between the input and the second output to the erecting mechanism, and a second array of magnets disposed in fixed position adjacent to the first magnets. Magnetic forces between the first and second magnet arrays inhibit rotation of the first magnets until overcome by torque applied to the first magnet array after the unit is erect.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

Figure 1:
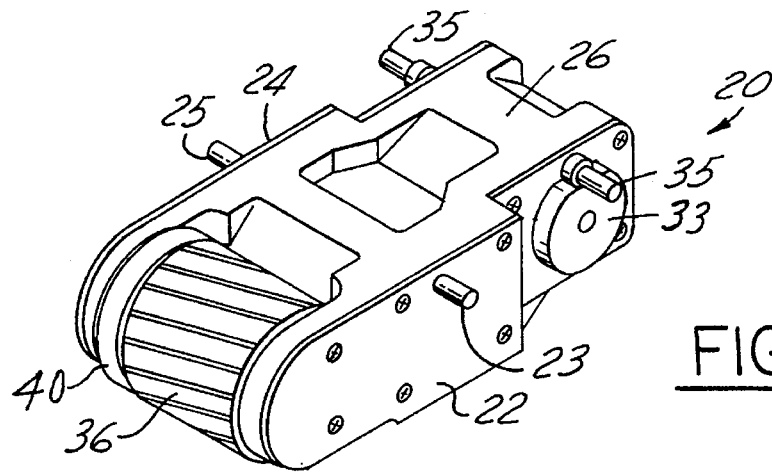
FIG. 1 is a perspective view of a self-erecting power drive unit in accordance with one presently preferred embodiment of the invention.
Figure 2:
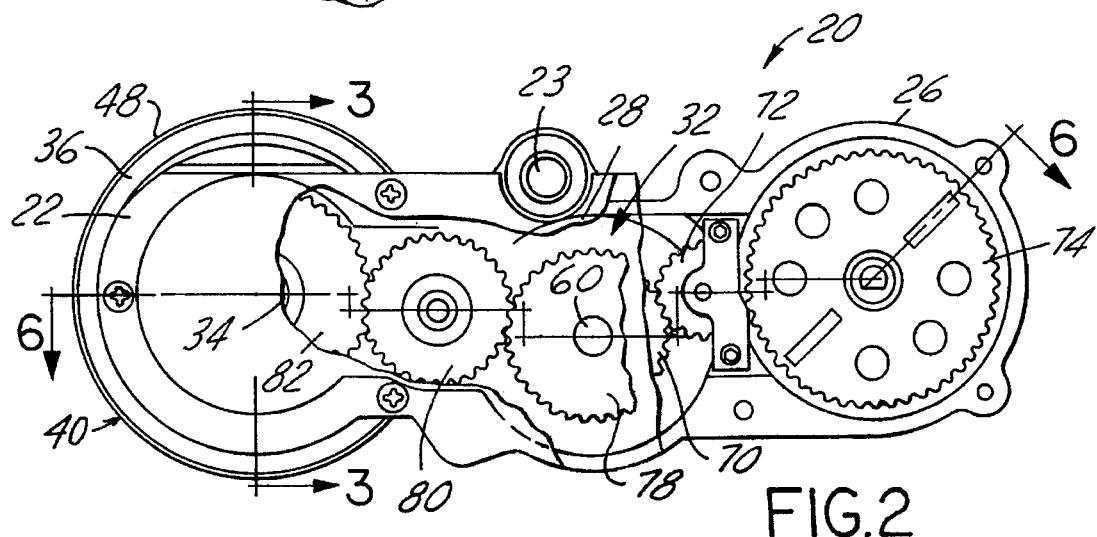
FIG. 2 is a partially sectioned side elevational view of the power drive unit illustrated in FIG. 1.
Figure 3:
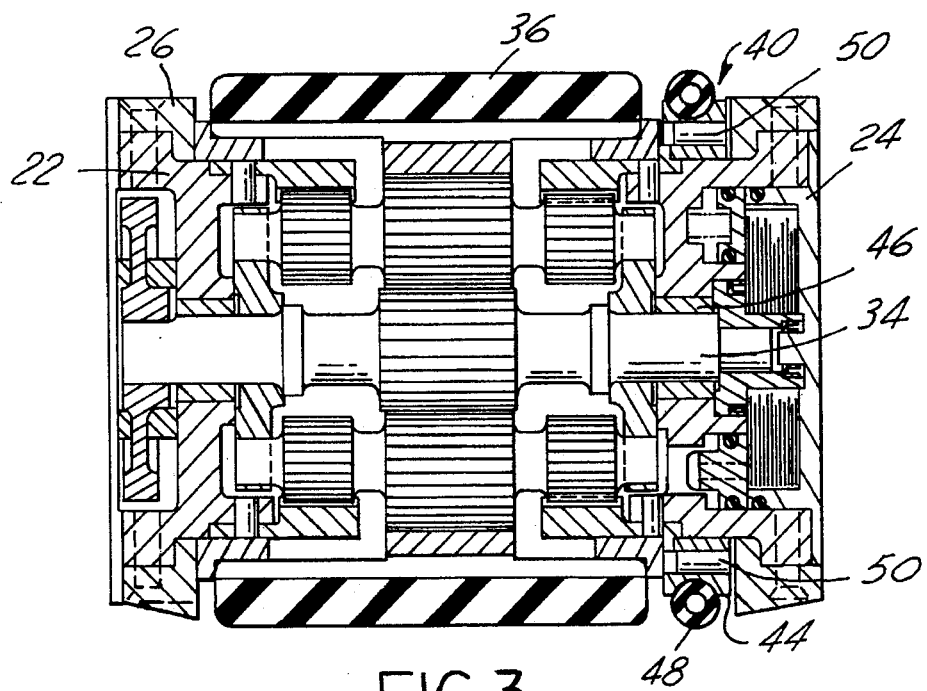
FIG. 3 is a sectional view taken substantially along the line 3—3 in FIG. 1.
Figure 4:
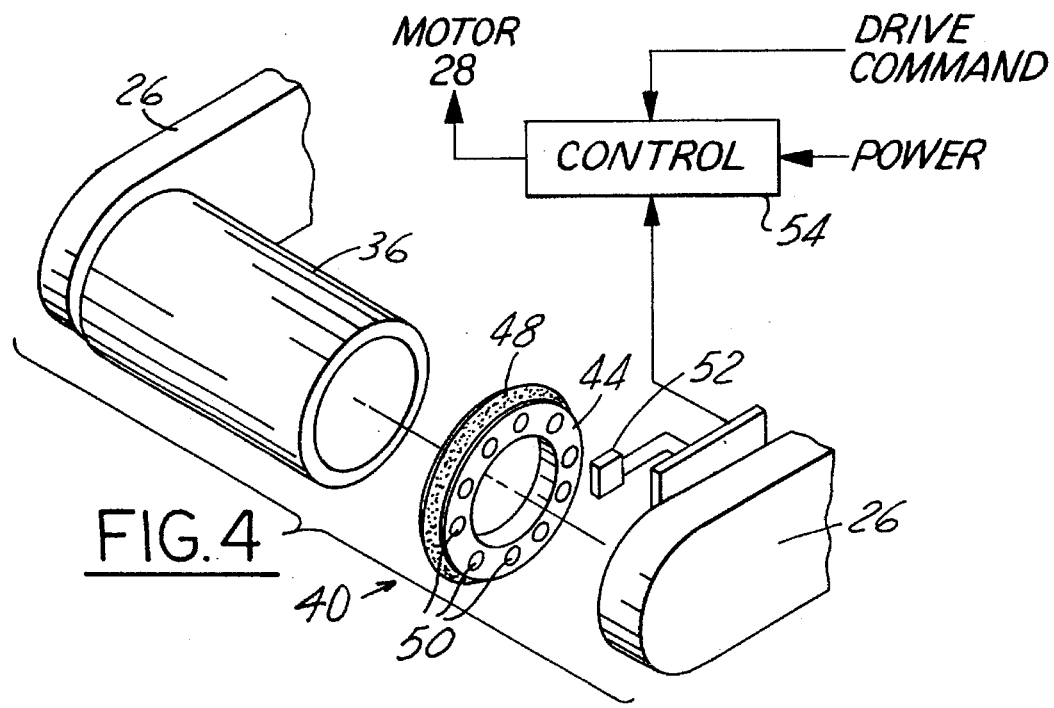
FIG. 4 is an fragmentary exploded perspective view of a portion of the drive unit illustrated in FIGS. 1–3.

FIGS. 1–4 illustrate a self-erecting power drive unit 20 in accordance with one presently preferred embodiment of the invention as comprising a pair of side plates 22,24 mounted on a support housing 26. Side plates 22,24 carry stub shafts 23,25 for pivotally mounting unit 20 to overlying conveyor support structure (not shown). An a.c. induction electric motor 28 (FIGS. 2 and 6) is mounted within support housing 26, and has an output shaft 30 coupled to a free-running power-splitting planetary gear differential 32. Differential 32 has one transmission output path coupled to a pair of cams 33 mounted externally of side plates 22,24. Each cam 33 is operatively coupled to a cam follower 35 carried by the support structure on which the power drive unit is mounted. A second gear path couples the motor to a drive shaft 34 on which a drive roller 36 is mounted. A torque control device 38 (FIG. 6) is coupled to differential 32 for controlling application of motor torque first to cams 34 for erecting unit 20, and then to drive roller 36 for propelling cargo along the handling system.

A scrub roller assembly 40 in accordance with one aspect of the present invention comprises of a hollow resilient tire 48 attached to a non-metallic disc 44 that rotates on a hub on the housing 26 separately from main drive roller 36. The outer periphery of tire 48 has a greater diameter than main drive roller 36, and is softer than drive roller 36, so that any cargo that engages drive roller 36 is also engaged by the tire 48. A plurality of permanent magnets 50 (FIGS. 3 and 4) are disposed in a circumferential array around non-metallic disc 44 radially inwardly of tire 48. A Hall effect sensor 52 is mounted in fixed position on support housing 26 adjacent to assembly 40. Sensor 52 is positioned for sequential registry with magnets 50 as they pass adjacent to the sensor when the roller assembly 40 is rotated by engagement with cargo propelled by drive roller 36. Sensor 52 is connected to suitable control electronics 54 (FIG. 4), which is responsive to a drive command signal from an operator or external control device for applying electrical power to electric motor 28.

In normal operation when drive unit 20 is erected and drive roller 36 engages cargo, the power applied to roller 36 propels the cargo in a direction tangential to the roller. As the cargo is moved by roller 36, the cargo rotates free wheeling sensor 40, so that magnets 50 provide a corresponding signal to control electronics 54 through sensor 52. In the event that the cargo becomes jammed or blocked and is held in position above drive unit 20, so that drive roller 36 scrubs against the opposing surface of the cargo, the cargo no longer rotates sensor 40, and the corresponding signal from sensor 52 to control electronics 54 is correspondingly interrupted. Control electronics 54 is responsive to such sensor signal to modulate power applied to motor 28, and thereby prevent excessive scrubbing and wear to the drive roller.

Figure 5:
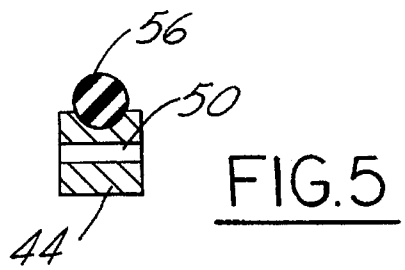
FIG. 5 is a fragmentary sectional view of a modification to the drive unit illustrated in FIGS. 1–4.

FIG. 5 illustrates a modification to sensor 40, in which hollow tire 48 is replaced by a solid resilient rubber tire 56.

Figure 6:
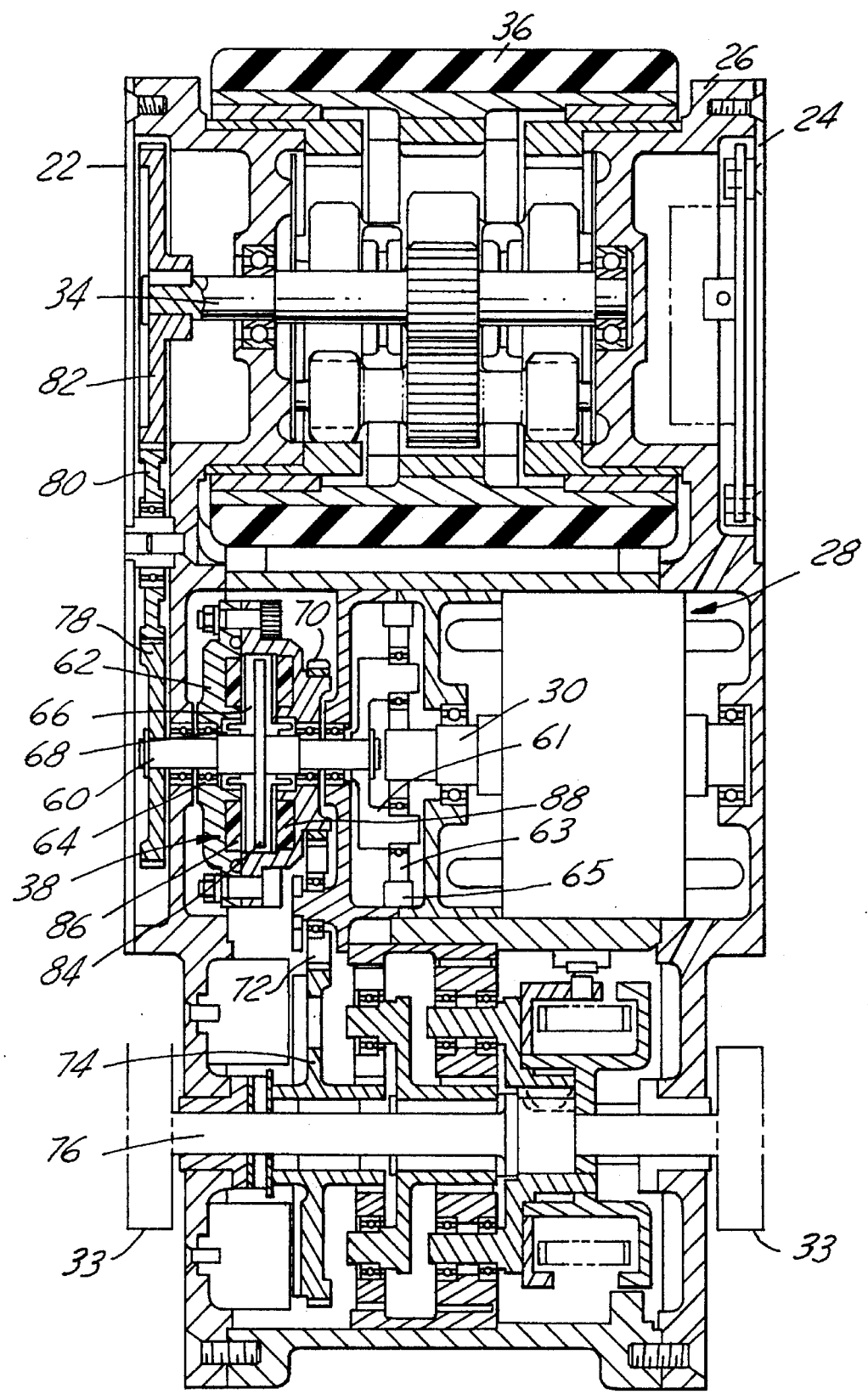
FIG. 6 is a sectional view taken substantially along the line 6—6 in FIG. 2.

FIG. 6 illustrates an erection/drive torque control 38 in accordance with one embodiment of the invention as comprising an input shaft 60 coupled to the output shaft of motor 28. A pinion gear on the end of motor shaft 30 is the sun gear of a planetary gear set and drives a carrier 61 through three planets against a ring gear 65. Carrier 61 drives shaft 60 by means of a spline or key connection at the interface of carrier 61 and shaft 60. A housing 62 surrounds shaft 60 and is rotatably supported thereon by the roller bearing 64. Housing 62 has an internal cavity 66 that cooperates with lip seals 68 to form a fluid chamber that is filled with a viscous fluid, such as a silicone fluid or hydraulic oil. A ring gear 70 on the external face of housing 62 operates through gears 72,74 to couple housing 62 to the shaft 76 that is coupled to lifting cams 34. A gear 78 on the motor-remote end of shaft 60 is connected through gears 80,82 to shaft 34 that drives roller 36.

A flange 84 radiates from shaft 60 within fluid chamber 66. A pair of annular metal plates 86 are carried by housing 62 on respective sides of flange 84 and are axially spaced from flange 84. An annular pad 88 is positioned on housing 62 behind each plate 86, and communicates with chamber 66 through a multiplicity of openings disposed in a circumferential array within each plate 86. Pads 88 are preferably of closed cell foam rubber construction.

In operation, upon initial application of electrical power to motor 28, initial rotation of shaft 60 is coupled by flange 84 and the viscous fluid within chamber 66 to surrounding housing 62, and thence by gears 70,72,74 to shaft 76 and erecting cams 33. The reaction force provided by cams 33 acting against fixed cam followers 35 creates a lifting force about coaxial drive unit pivot shafts 23,25. Thus, the initial motor torque functions through the viscous fluid to erect the drive unit from its retracted or lowered position in which drive roller 36 is spaced beneath the cargo surface of the overlying ball or roller conveyor (not shown), to its raised or erected position in which roller 36 is disposed at the conveyor cargo surface so that the roller may drivably engage cargo carried by the conveyor. When the unit is fully erected against stops (not shown) that are built into the fixed support structure, the fluid within chamber 66 will begin to shear, so that further motor torque is applied to drive roller 36 through differential gear 78,80,82 and shaft 34. The torque limit of torque control 38 is a function of velocity of shaft 60, the viscosity of the fluid within chamber 66, and the area and shearing of the torque transfer surfaces of flange 84 and rings 86. The through-openings in rings 86 not only permit communication of fluid to the underlying pads 88, but also increase frictional effects of the ring surfaces. Pads 88 accommodate thermal expansion of the viscous fluid within chamber 66.

Figure 7:
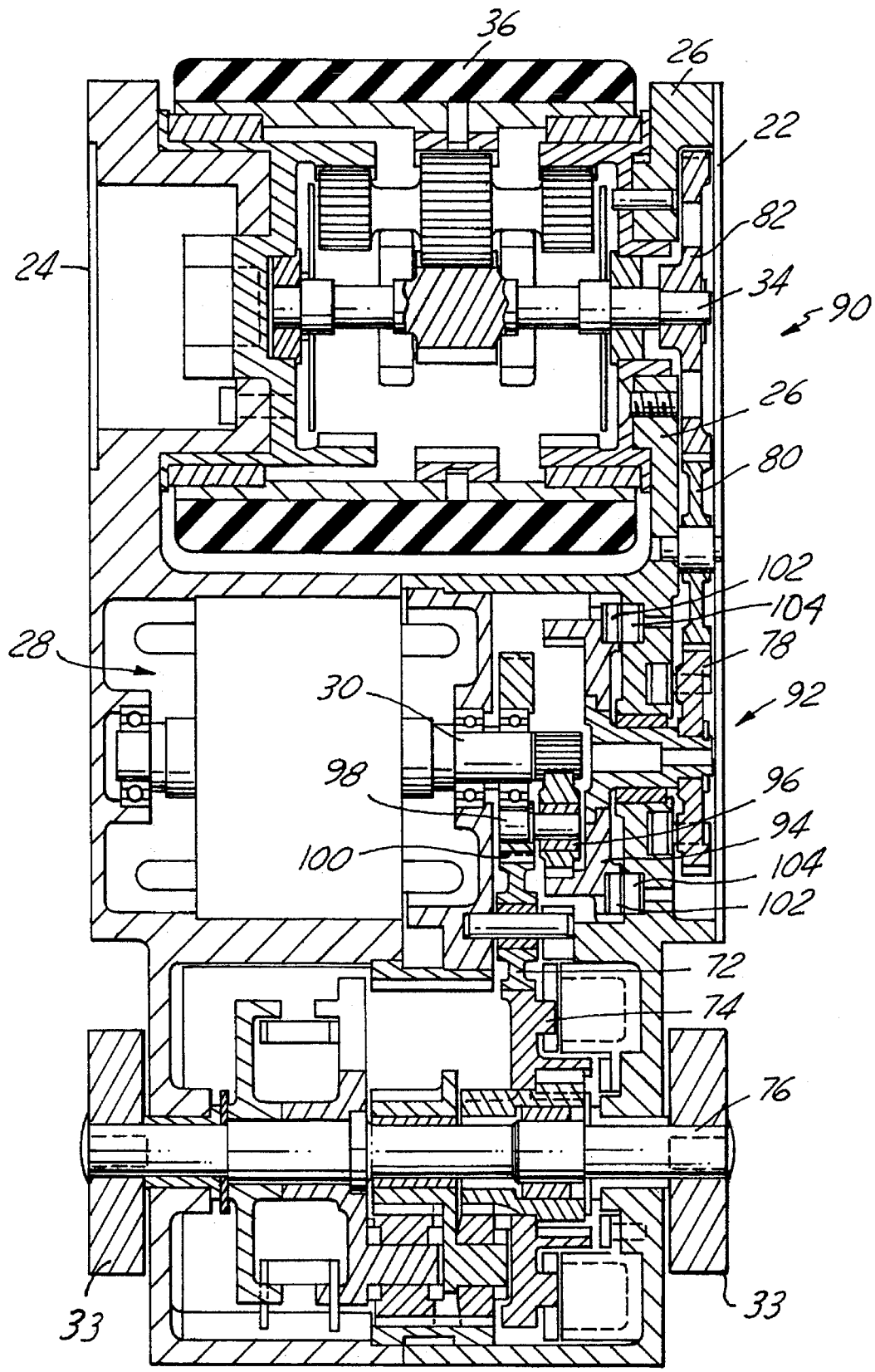
FIG. 7 is a sectional view similar to that of FIG. 6 but showing a modified embodiment of the invention.

FIG. 7 illustrates a self-erecting power drive unit 90 in accordance with a modified embodiment of the invention, in which reference numerals identical to those employed in connection with FIGS. 1–6 indicate identical or related components. The power-splitting planetary gear differential 92 in FIG. 7 includes a ring gear 94 directly coupled by a gear 96 to motor output shaft 30. Gear 78 is mounted on gear 94. Gear 96 is also connected by a shaft 98 to a gear 100, which in turn is connected by gears 72,74 to shaft 76 and erecting cams 34. A plurality of magnets 102 are mounted in an axially oriented circumferential array around the periphery of ring gear 94. A second array of magnets 104 are mounted in fixed position on support 26 in axial opposition to magnets 102 on gear 94. In one working embodiment of the invention eight magnets 102 are carried by ring gear 94, and eight magnets 104 are carried by support 26. The magnets are of NdFeB composition, and are oriented such that like poles axially oppose each other.

In operation, the magnetic clutch effect provided by opposed magnet arrays 102,104 initially resist transfer of torque to drive roller 36, so that the initial output torque from motor 28 is fed by gears 100,72,74 to shaft 76 and erecting cams 34. When unit 90 has been fully erected and further rotation of shaft 76 is resisted, the torque applied to ring gear 94 becomes sufficient to overcome the effect of magnet arrays 102,104, so that the motor output torque is now applied by gears 80,82 and shaft 34 to drive roller 36. The magnetic clutch embodiment of FIG. 7 has the advantages over the viscous fluid embodiment of FIG. 6 that the chance of fluid leakage is eliminated, as is the weight of the viscous fluid itself.

Figure 8:
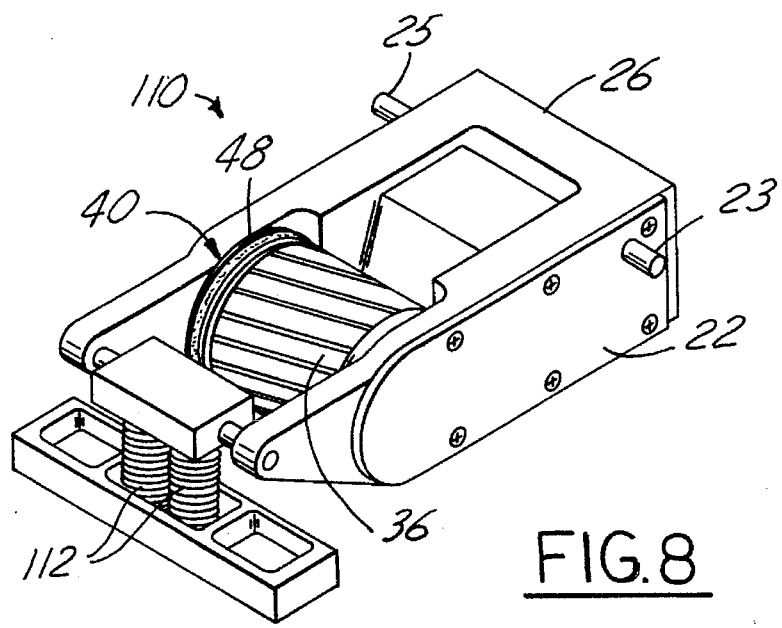
FIG. 8 is a perspective view of a spring-loaded power drive unit in accordance with a further embodiment of the invention.

FIG. 8 illustrates a spring-loaded power drive unit 110 having coil springs 112 for urging drive roller 36 into engagement with cargo disposed above the unit, and with a scrubbing sensor 40 as hereinabove described in connection with FIGS. 1–4.

I claim:

1. A power drive unit for aircraft cargo handling systems comprising:

an electric motor responsive to application of electrical power for rotating a motor output shaft, a drive roller mounted for rotation about an axis parallel to said motor output shaft and carried for engagement with cargo to be driven by said unit, gear means coupling said motor output shaft to said drive roller for rotating said drive roller responsive to application of electrical power to said motor, and scrub sensing means for modulating application of electrical power to said motor when said drive roller is scrubbing against cargo engaged by said scrub sensing means.

2. The unit set forth in claim 1 wherein said scrub sensing means comprises:

a second roller mounted for free rotation adjacent to said drive roller and having a periphery disposed for engagement with cargo engaged by said drive roller, means for sensing rotation of said second roller, and means for modulating application of electrical power to said motor responsive to said rotation-sensing means.

3. The unit set forth in claim 2 wherein said rotation-sensing means comprises at least one magnet carried by said second roller, and magnetic sensing means disposed adjacent to said second roller and responsive to periodic passage of said magnet for sensing rotation of said second roller.

4. The unit set forth in claim 3 wherein said at least one magnet comprises a plurality of magnets disposed in a circumferential array around said second roller.

5. The unit set forth in claim 4 wherein said magnetic sensing means comprises a Hall effect sensor.

6. The unit set forth in claim 2 wherein said second roller is mounted for free rotation coaxially with said drive roller and has an outer periphery at greater diameter than and softer than outer diameter of said drive roller.

7. The unit set forth in claim 6 wherein said second roller is of solid resilient construction.

8. The unit set forth in claim 6 wherein said second roller is of hollow resilient construction.

9. The unit set forth in claim 1 further comprising means for erecting said unit from a retracted position to an erected position in which said drive roller is positioned to engage cargo, said gear means comprising a power-splitting planetary gear differential having an input coupled to said motor output shaft, a first output coupled to said erecting means and a second output coupled to said drive roller shaft, and torque control means coupled to said differential for first coupling drive torque for said motor to said erecting means and then coupling drive torque from said motor to said drive roller after said unit is erect.

10. The unit set forth in claim 9 wherein said torque control means comprises an input shaft coupled to said motor output shaft, a fluid housing surrounding said input shaft and having an internal cavity forming a fluid chamber, a viscous fluid in said chamber, flange means in said chamber coupled to said input shaft, and means coupling said fluid housing to said erecting means, said flange means and said viscous fluid transferring torque from said input shaft to said erecting means until said fluid shears and prevents application of further torque to said fluid housing and said erecting means.

11. The unit set forth in claim 10 wherein said fluid housing includes resilient means operatively coupled to said chamber for accommodating thermal expansion of said fluid.

12. The unit set forth in claim 9 wherein said torque control means comprises first magnetic means rotatably coupled to said differential between said input and said second output and second magnetic means disposed in fixed position adjacent to said first magnetic means, magnetic forces between said first and second magnetic means inhibiting rotation of said first magnetic means until overcome by torque applied to said first magnetic means after said unit is erect.

13. The unit set forth in claims 12 wherein said differential includes a gear between said input and said second output, said first magnetic means comprising a first circumferential array of magnets mounted on said gear.

14. The unit set forth in claim 13 wherein said second magnetic means comprises a second circumferential array of magnets mounted in fixed position in opposition to said first array.

15. A self-erecting power drive unit for aircraft cargo handling systems comprising:

an electric motor responsive to application of electrical power for rotating a motor output shaft, a drive roller mounted for rotation about an axis parallel to said motor output shaft and carried for engagement with cargo to be driven by said unit, means for erecting said unit from a retracted position to an erected position in which said drive roller is positioned to engage cargo, a power-splitting planetary gear differential having an input coupled to said motor output shaft, a first output coupled to said erecting means and a second output coupled to said drive roller, and torque control means coupled to said differential for first coupling drive torque from said motor to said erecting means and then coupling drive torque from said motor to said drive roller when said unit is erect, said torque control means comprising first magnetic means rotatably coupled to said differential between said input and said second output and second magnetic means disposed in fixed position adjacent to said first magnetic means, magnetic forces between said first and second magnetic means inhibiting rotation of said first magnetic means until overcome by torque applied to said first magnetic means after said unit is erect.

16. The unit set forth in claims 15 wherein said differential includes a gear between said input and said second output, said first magnetic means comprising a first circumferential array of magnets mounted on said gear.

17. The unit set forth in claim 16 wherein said second magnetic means comprises a second circumferential array of magnets mounted in fixed position in opposition to said first array.

18. The unit set forth in claim 15 further comprising scrub sensing means for modulating application of electrical power to said motor when said drive roller is scrubbing against cargo engaged by said drive roller.

19. The unit set forth in claim 18 wherein said scrub sensing means comprises:

a second roller mounted for free rotation adjacent to said drive roller and having a periphery disposed for engagement with cargo engaged by said drive roller, means for sensing rotation of said second roller, and means for modulating application of electrical power to said motor responsive to said rotation-sensing means.

20. The unit set forth in claim 19 wherein said second roller is mounted for free rotation coaxially with said drive roller and has an outer periphery at greater diameter than and softer than outer diameter of said drive roller.

21. The unit set forth in claim 20 wherein said rotation-sensing means comprises at least one magnet carried by said second roller, and magnetic sensing means disposed adjacent to said second roller and responsive to periodic passage of said magnet for sensing rotation of said second roller.

\* \* \* \* \*